US012566796B1

(12) United States Patent
Gurram et al.

(10) Patent No.: US 12,566,796 B1
(45) Date of Patent: Mar. 3, 2026

(54) QUERY-DEPENDENT GENERATIVE DESCRIPTIONS FOR VIDEOS PROVIDED VIA A SEARCH RESULT

(71) Applicant: GOOGLE LLC, Mountain View, CA (US)

(72) Inventors: Bhaskar Srinivas Gurram, Mountain View, CA (US); Chen Cai, San Jose, CA (US); Anurag Vyas, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/907,036

(22) Filed: Oct. 4, 2024

(51) Int. Cl.
 *G06F 16/735* (2019.01)
 *G06F 16/732* (2019.01)

(52) U.S. Cl.
 CPC .......... *G06F 16/735* (2019.01); *G06F 16/732* (2019.01)

(58) Field of Classification Search
 CPC ............................ G06F 16/735; G06F 16/732
 USPC ......................................................... 707/728
 See application file for complete search history.

(56) References Cited

U.S. PATENT DOCUMENTS

| | | | | | |
|---|---|---|---|---|---|
| 11,769,017 | B1 * | 9/2023 | Gray | .................... | G06F 40/56 |
| | | | | | 704/9 |
| 2020/0065304 | A1 * | 2/2020 | Bakir | .................... | G06F 40/143 |
| 2024/0256582 | A1 * | 8/2024 | Jain | .................... | G06F 16/3329 |
| 2024/0289395 | A1 * | 8/2024 | Zhou | .................... | G06F 16/9532 |
| 2024/0370661 | A1 * | 11/2024 | Hirshberg | .............. | G06F 40/40 |
| 2024/0378251 | A1 * | 11/2024 | Boyd | .................... | G06T 11/60 |
| 2025/0005050 | A1 * | 1/2025 | Krishnan | .............. | G06F 16/338 |
| 2025/0124264 | A1 * | 4/2025 | Wang | .................... | G06F 40/166 |
| 2025/0181844 | A1 * | 6/2025 | Rosset | .................... | G06F 40/30 |
| 2025/0190507 | A1 * | 6/2025 | Gadit | .................... | G06F 16/93 |

OTHER PUBLICATIONS

Deng, Haolin, et al., "WebCiteS: Attributed Query-Focused Summarization on Chinese Web Search Results with Citations", arXiv, Cornell University archive document No. arXiv: 2403.01774v2 [cs.CL], May 29, 2024, pp. 1-20.*

Sadat, Mobashir, et al., "DelucionQA: Detecting Hallucinations in Domain-specific Question Answering", arXiv, Cornell University archive document No. arXiv: 2312.05200v1 [cs.CL], Dec. 8, 2023, pp. 1-14.*

* cited by examiner

*Primary Examiner* — Robert Stevens
(74) *Attorney, Agent, or Firm* — Brake Hughes Bellermann LLP

(57) ABSTRACT

Disclosed implementations for providing a description in a search result for a resource providing video content. A resource providing video content is received. A query having the resource as a relevant result is generated. A description of the resource is generated by processing a prompt through a generative model. The prompt includes the query and descriptive content related to the video content. The query and the description are stored based on a groundedness score meeting a groundedness threshold. The groundedness score indicates an alignment between the description and the prompt. The description is provided in a search result that includes the resource.

20 Claims, 6 Drawing Sheets

FIG. 2B

Receive a Resource
302

Determine a Query
304

Generate a Description of the Resource
306

Store the Query and the Description
308

Provide the Description
310

400

Receive a Search Query
402

Determine a Video Responsive to the
Search Query
404

Select Description
406

Provide Response
408

1

QUERY-DEPENDENT GENERATIVE DESCRIPTIONS FOR VIDEOS PROVIDED VIA A SEARCH RESULT

BACKGROUND

A search result provided via a search engine is typically displayed with a concise description of the resource (e.g., web page). The concise description is typically positioned beneath a hyperlink to the resource. In many cases, these descriptions are extracted directly from the resource.

SUMMARY

Implementations of the systems and methods described herein provide concise, query-specific snippets (e.g., a description of the content that is provided by the resource and relevant to the search query) for search results that include video resources (i.e., resources that provide video content). The snippets may be displayed to a user in a search result page. In some implementations, snippets are generated prior to receiving a search query via a series of trained generative models and retrieved at query time. Implementations described herein may derive information from the video content using a combination of techniques, such as via optical character recognition (OCR), entity recognition, image understanding, transcript generation, and the like, to be provided to the models as, or as part of, the video content.

In an example implementation, a resource providing video content is received (e.g., as the resource is being indexed by a search system). A query having the resource as a relevant result is determined. A description of the resource is generated by processing a prompt through a generative model, the prompt including the query and descriptive content related to the video content. The query and the description are stored based on a groundedness score meeting a groundedness threshold, the groundedness score indicating an alignment between the description and the prompt. The description is provided in a search result that includes the resource.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

The following detailed description that sets forth aspects of the subject matter, along with the accompanying drawings of which:

FIG. 2B depicts an example media verification, according to disclosed implementations;

2

Figure 3:
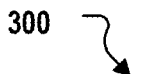
Figure 3:
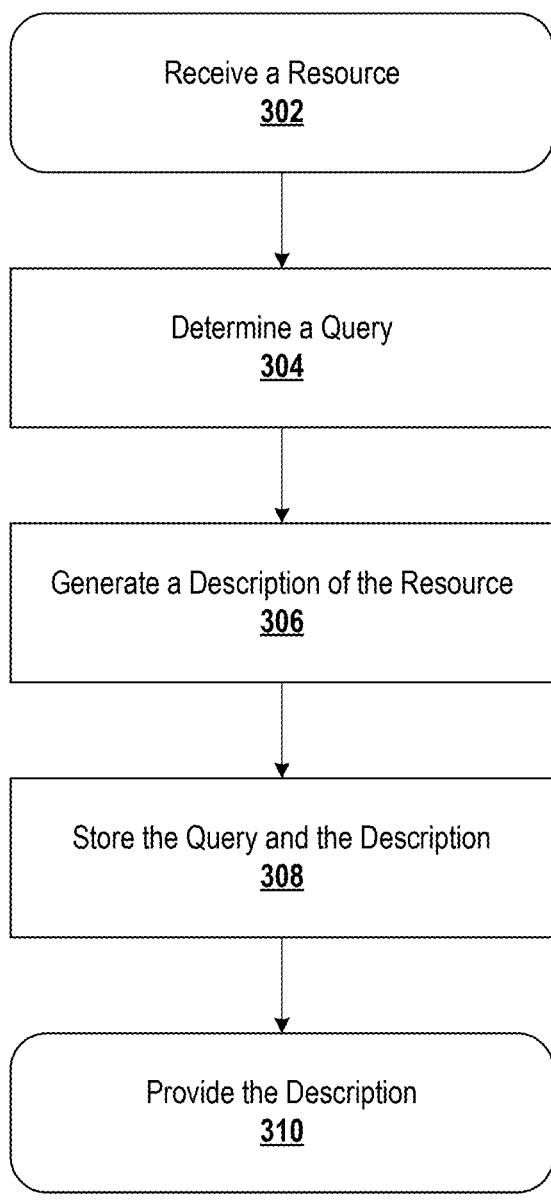
Figure 4:
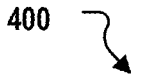
Figure 4:
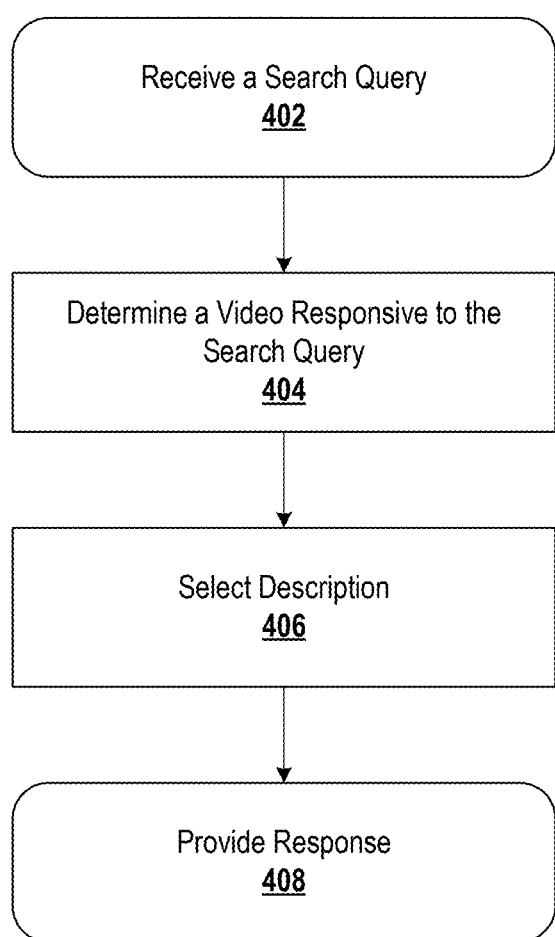
Figure 5:

FIG. 3 depict a flowchart of a non-limiting process that can be performed by implementations of the present disclosure;

FIG. 4 depict a flowchart of another non-limiting process that can be performed by implementations of the present disclosure; and FIG. 5 depicts an example of a distributed computer device that can be used to implement the described techniques.

DETAILED DESCRIPTION

A concise description (also referred to herein as a "snippet") of a search result provided via a search engine offers a brief overview of content presented in the respective resource (e.g., the web page or other document corresponding to the search result). Additionally, a resource is typically extensive and encompasses various topics; often the interests expressed via a search query may not encompass all or even most of these topics. Therefore, aligning the content of a snippet with the search query offers maximum utility to the user. Accordingly, in many cases, a snippet is generated using a succinct excerpt (e.g., one or two lines) from a resource and tailored to align closely with the search query, facilitate identification of pertinent information, and instill confidence that the desired details are accessible within the resource. Moreover, where the search result corresponds to a web page, the informational value provided by a snippet complements the page title ensuring that the information provided avoids excessive repetition of the page title while providing relevant insights.

Moreover, when search results include a video resource(s) (e.g., a resource that provides video content), these video search results may be displayed across multiple sections of the search result page provided via the search engine. Each section may include, for example, a collection of search results and rich results, such as knowledge panels and the like, that are responsive to a query. In some cases, a search engine may group video results into a single block for display as a unit on the search result page. In another example, video search results may be blended with (integrated with) search results for other types of resources (e.g., web pages).

The bulk of the relevant information (in the context of search results) of resources providing video content exists in the video content with some relevant information in textual content from the resource, such as the page title, description, metadata, and the like. Current solutions for providing search results that include videos that are responsive to a query derive snippets from the textual content of the resource that provides the video; however, the textual content often fails to reflect the more relevant content that is included in the video content itself.

Transcripts of video content (e.g., text derived from speech in the video content), which may be generated by automatic speech recognition models, provide access to content that is spoken by an individual in the video. However, simply using transcripts has several technical problems. For example, transcripts are verbose as human speech is wordy and often much longer than written communications because of the use of filler words, such as "um," "uh," and so forth. Moreover, when speaking, humans tend to go back and forth between ideas when explaining a topic, which causes the "answer" to be spread across the entire video. Additionally, processing a transcript through a generative model is expensive and time consuming, making transcript generation impractical for search engines that provide results to a query very quickly (e.g., measured in milliseconds).

Accordingly, implementations of the described snippet generating system provide at least one technical solution to these technical problems by generating concise (e.g., a couple of lines), query-specific snippets for a video search result that may be displayed to a user in a search result page. In some implementations, snippets are generated prior to receiving a query via a series of trained generative models and retrieved at query time. The snippets are grounded to the video resource (i.e., the input resource) by combining the video content and other information provided by the video resource (e.g., text related to the video content) and using this combined information as input to a generative model. The system may derive information from the video content using a combination of techniques, such as via OCR, entity recognition, image understanding, transcript generation, and the like, to be provided to the model as or as part of the video content. The snippet generated for a video and query pair in this manner is more relevant to the respective query and of higher quality, providing value beyond just the title of the document (i.e., page title) or a brief user-provided description related to the video. Additionally, implementations provide snippets that are grounded and improve the summarization and understanding of the whole multi-modal contents of web documents. Furthermore, systems consistent with disclosed implementations increase search result utilization for web documents that provide videos and do not introduce latency.

In an example implementation, the system employs three separate generative models: a snippet model, a verification model, and a query generation model. In some cases, the snippet model (e.g., a generative model) generates a snippet from inputs such as a query, document information (e.g., page title, description, metadata, and so forth) and the video content, which may include information derived from the video content such as a transcript, entity recognition, OCR information, etc. In some cases, the verification model is trained to ascertain whether the generated snippets are grounded with respect to the original content (e.g., the video and related document content). In some cases, the query generation model generates a query set that includes queries pertaining to a video and associated documents, which are then fed into the snippet model.

As described above, in some implementations, the snippets are generated and indexed prior to a user entering a query and retrieved during query time (i.e., when search results are generated for the query). In such cases, a set of queries and snippets associated with each query are determined (e.g., generated or selected from historical queries) for a given resource that provides video content (referred to herein as a video resource). A snippet for a video resource that is responsive to a user's query is selected based on the set of queries and associated snippets. For example, a received query (e.g., provided via a user computing device) is compared against the indexed queries to determine a most relevant query from the indexed queries and the corresponding previously generated, query-dependent snippet for the responsive video result is provided in the search results.

Example Environment

Figure 1:
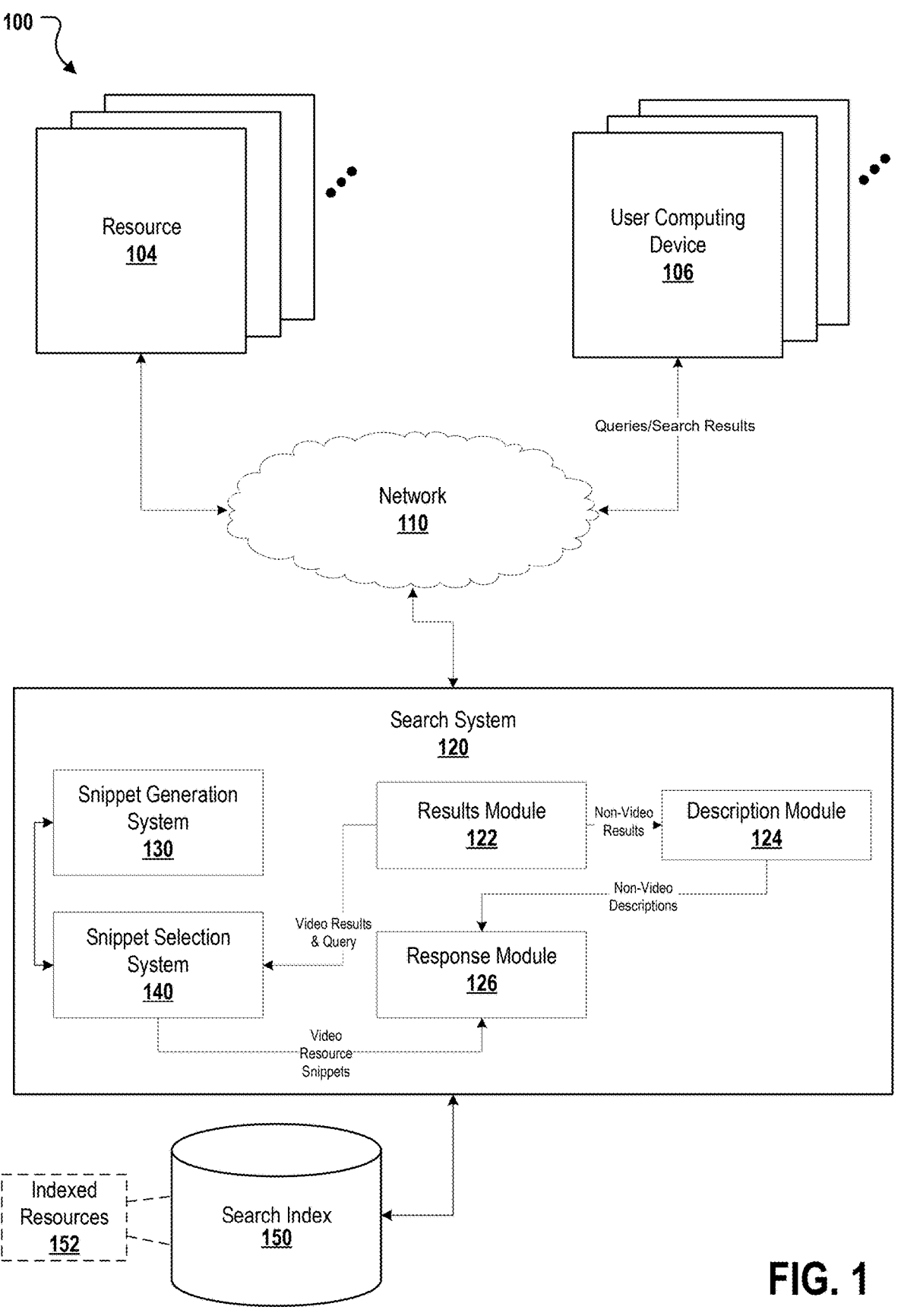
FIG. 1 depicts an example environment that can be employed to execute implementations of the present disclosure.

FIG. 1 is a block diagram of an example environment 100 in which users can interact with the described snippet generating system employing one or more generative models trained to provide query-specific snippets for search results that include video results (e.g., resources that provide video content). The example environment 100 includes a search system 120 that includes a snippet generation system 130 and a snippet selection system 140 as well as results module 122, description module 124, and response module 126. As depicted, the example environment 100 also includes a communications network 110 that connects the search system 120, user computing devices 106, and resources 104. In some implementations, one or more of the modules 122, 124, 126 and systems 120, 130, 140 are executed via an electronic processor (e.g., processing units) configured to process instructions (e.g., modules, engines, models) stored in a memory, such as described below with reference to FIG. 5.

The communications network 110 may include wireless and wired portions that may be accessed over a wired and/or a wireless communications link. For example, user computing devices 106, such as smartphones can use a cellular network to access the network 110. The example environment 100 may include millions of resources 104 (e.g., provided via websites) and user computing devices 106. In some cases, the communications network 110 is implemented using one or more existing networks, for example, a cellular network, the Internet, a land mobile radio (LMR) network, a BLUETOOTH network, a wireless local area network (for example, Wi-Fi), a wireless accessory Personal Area Network (PAN), a Machine-to-machine (M2M) network, and a telephone network. The communications network 110 may also include future developed networks. In some implementations, the communications network 110 includes the Internet, an intranet, an extranet, or an intranet and/or extranet that is in communication with the Internet. In some implementations, the communications network 110 includes a telecommunication or a data network.

Resources 104 may include any content that is accessible, via an identifier, by a search engine. Resources 104 may include content, such as video content, provided by a server (e.g., a webserver). Thus, resources 104 may include web resources, documents, programming elements, and the like. Other example web resources include, but are not limited to, text, images files, video files, audio files, feed sources, and the like. In some cases, a resource 104 may include or link to a web resource (e.g., a web page) that provides data that can be accessed via the communications network 110 using a resource address (e.g., a uniform resource locator (URL)). In some cases, the web resources 104 are formatted in a markup language (e.g., hypertext markup language (HTML), extensible markup language (XML), and the like). In some cases, the resources 104 (e.g., web resources) include embedded information such as metadata information, hyperlinks, embedded instructions (e.g., scripts) and the like. In some cases, the resources 104 are published by a resource provider via a website. Such a website may include a collection of the resources 104.

In some cases, the search system 120 as well as publishers of some of the resources 104 are associated with a domain(s) and hosted by one or more servers in one or more locations. In some cases, these one or more servers include a server-class hardware type device and/or computer systems using clustered computers and components to function as a single pool of seamless resources when accessed through the communications network 110. For example, such implementations may be used in data center, cloud computing, storage area network (SAN), and network attached storage (NAS) applications. In some implementations, the one or more servers are deployed using a virtual machine(s).

In some implementations, user computing device(s) 106 is an electronic device capable of providing and receiving (e.g., a request) resources (e.g., media content) over the communications network 110. In some implementations, user computing device 106 is sustainably similar to the computing device 500 described below with reference to FIG. 5. Example user computing devices 106 include personal computers, mobile communication devices, tablet computers, Extended Reality (XR) devices, and the like. The user computing devices 106 may include (e.g., may each include) any appropriate type of computing device, such as a desktop computer, a laptop computer, a handheld computer, a tablet computer, a personal digital assistant (PDA), an augmented reality (AR)/virtual reality (VR) device, a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the search system 120 accesses a search index 150 to search resources 104. In some implementations, the search index 150 includes a datastore of resources 104 (indexed resources 152) generated by crawling the information (e.g., web sites) provided by the publisher of the resource 104. In some implementations, the search index 150 is a repository for persistently storing and managing collections of data. Example data stores, such as the search index 150, that may be employed within the described system include data repositories, such as a database as well as simpler store types, such as files, emails, and so forth. In some implementations, the search index 150 includes a database. In some implementations, a database is a series of bytes or an organized collection of data that is managed by a database management system (DBMS).

In some implementations, the snippet generation system 130 is configured to generate and store snippets for resources 104 providing video content (also referred to herein as a video resource 104). In some implementations, the snippet generation system 130 generates snippets during the crawling, processing, and indexing phase of the search system 120 (e.g., when the search system builds the search index 150). In some implementations, the snippet generation system 130 processes the video resources 104 through a number of generative models to generate and verify query specific snippets for each video resource 104. Once verified, the snippet generation system 130 may store the query specific snippets to datastore, such as search index 150 or to a separate datastore, for retrieval by the snippet selection system 140 at query time (e.g., when a query is received from a user computing device 106).

In some implementations, the snippet generation system 130 generated snippets that are grounded to a resource 104 by combining the video content and non-video content (e.g., text include text content, a page title, a page or video description, metadata, and the like). The snippet generation system 130 may access the video content via, for example, OCR, entity recognition, image understanding, transcript generation, and the like. In some cases, the snippet generation system 130 generates the query specific snippets are provided via the online system in response to a query to increase utilization by improving a user's understanding of the multi-modal contents of the respective video resource 104.

As described above, in some implementations the snippet generation system 130 employs a snippet model, a verification model, and a query generation model. In some cases, the snippet generation system 130 provides the video resources 104 to the query generation model as input. In some cases, the query generation model is trained to generate, for each video resource provided as input, a set of queries pertaining to the video resource 104 and/or the video content provided by a video resource 104.

In some cases, the snippet generation system 130 provides each query in the set of queries (or a subset of the set of queries) to the snippet model along with the respective video resource 104 (e.g., both the video content and the text content). In some cases, the snippet model generates a query specific snippet for each query and video resource combination provided. In some cases, the snippet model may also process content generated from the video resource 104 such as a transcript of the video. In some cases, the snippet model may be trained to generate a transcript from the video.

In some implementations, the snippet generation system 130 is trained to provide snippets generated by the snippet model as well as the video resource 104 to the verification model as input. In some implementations, the verification model is trained to determine whether the generated snippets are grounded with respect to the video resource 104. In some implementations, the snippet generation system 130 indexes and stores the generated snippets to a snippet datastore. In some cases, the snippet datastore and the search index are part of the same datastore. In some cases, the snippet datastore and the search index are separate datastores.

In some implementations, the user computing devices 106 are configured to submit search queries to the search system 120 (e.g., via a web service provided by the search system 120). In some examples, a user computing device 106 can include one or more input modalities. Example input modalities can include a keyboard, a touchscreen, a mouse, a stylus, and/or a microphone. For example, a user can use a keyboard and/or touchscreen to type in a search query. As another example, a user can speak a search query, the user speech being captured through the microphone, and processed through speech recognition to provide the search query.

In some implementations, in response to receiving a search query, the search system 120 processes the query via the results module 122, which is configured to access the search index 150 to identify resources 104 that are relevant to the search query (e.g., have at least a minimum specified relevance score for the search query). In some implementations, the results module 122 is configured to provide the video resources from the identify the resources 104 for the query to the snippet selection system 140 to select a query specific snippet for each video resource. For example, the snippet selection system 140 may be configured to select a snippet for each of the video results from the snippet datastore based on the query provided via the user computing device 106 and the respective video result, which corresponds to a video resource 104. The snippet generation system 130 and snippet selection system 140 are described in more detail below with respect to FIGS. 2A and 2B.

In some implementations, the results module 122 is configured to identify the resources 104 that do not include video content (referred to herein as non-video resources) to the description module 124. The description module 124 is configured to generate snippets for these non-video resources. In some implementations, the response module 126 is configured to combine the snippets for the video resources 104 and the non-video resource 104 into search results.

In some cases, the search system 120 may provide the search results, which include the identified resources 104 and snippets, as part of a search result page to the user computing device 106 from which the query was received. In some cases, each search result included in a search result page includes a link to a corresponding resource. Put another way, each search result represents/is associated with a resource. In some cases, the search result pages includes a snippet (e.g., a query specific snippet selected based on the query and video content presented by the search result), an image associated with the resource, other information relevant to the resource and/or the query, page title, knowledge panels, short answers, other types of rich results, links to limit the search to a particular resource type (e.g., images, travel, shopping, news, videos, and the like), other suggested searches, and the like.

Figure 2A:
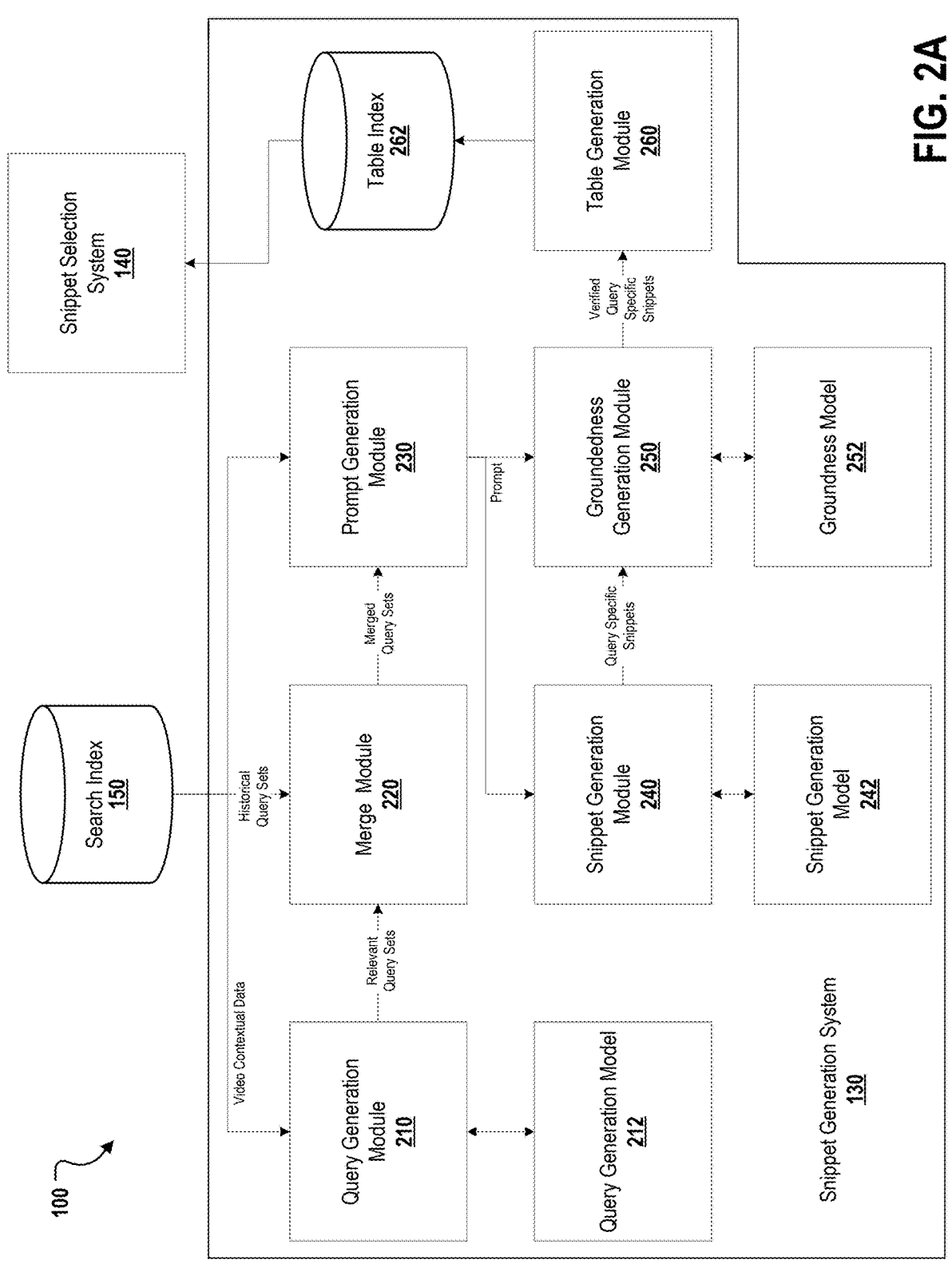
FIG. 2A depicts an example snippet generation system, according to disclosed implementations.

FIG. 2A is a diagram that illustrates an example of the snippet generation system 130, according to disclosed implementations. As described above, the snippet generation system 130 may be configured to generate and store snippets for video resources 104 (e.g., resources that provide video content). As depicted in FIG. 2A, the snippet generation system 130 includes query generation module 210, query generation model 212, merge module 220, prompt generation module 230, snippet generation module 240, snippet generation model 242, groundedness generation module 250, groundedness model 252, table generation module 260, and table index 262. In some implementations, the modules 210, 220, 230, 240 and 250 as well as the generative models 212, 242, and 252 are executed via an electronic processor (e.g., processing units) configured to process instructions (e.g., modules, engines, models) stored in a memory, such as described below with reference to FIG. 5.

The query generation module 210 is configured to generate a set of relevant queries for a video resource stored to the search index 150 (e.g., by the search system 120 described above with reference to FIG. 1). As depicted in FIG. 2A, in some cases, the query generation module 210 generates a set of queries for each video resource by employing the query generation model 212. In some implementations, the query generation module 210 retrieves information related to a video resource from the search index 150. Examples of the information related to a video resource that may be retrieved from the search index 150 includes, but are not limited to, the page title, a description of the page and/or the video content, metadata includes in the resource, text content, and other content parsed from the resource during indexing of the video resource by the search system 120.

In some cases, the query generation module 210 is configured to generate a transcript of the video content provided by the video resource. For example, the query generation module 210 may employ a speech recognition model (not shown in FIG. 2B) trained to extract the relevant speech transcripts for the video content. In other cases, a transcript for the video content may be generated by another module in the search system 120 and stored to the search index 150 for use by the query generation module 210.

In some implementations, the query generation module 210 provides the information related to the video resource including the video, the related content, and the transcript as inputs to the query generation model 212. For example, the query generation module 210 may be configured to generate a prompt using the relevant information and provide the prompt to the query generation model 212. In some implementations, the query generation model 212 is a generative model trained to provide a set of queries relevant to the video resource and respective video content. For example, the query generation model 212 may be trained to assimilate the contents provided by the video resource (e.g., page title, description) the video transcript, and/or the video content to generate a set of relevant queries that may be issued by a user where the video resource is relevant/responsive.

The merge module 220 is configured to generate a set of queries for the video resource based on the set of queries generated by the query generation module 210 (e.g., via the query generation module 210) and historic navigational queries for the video resource stored to, for example, the search index 150. A historic navigational query is a query that historically had the video resource and/or respective video content result impressed and clicked by a user. This data provides a chronological record of the relevant inquiries for which the outcomes are impactful, pertinent, and advantageous to the users. In some cases, the merge module 220 combines (e.g., removing duplicates including removing queues that match semantically) the queries provided by the query generation module 210 and the historic navigational queries into the set of queries. In some cases, the merge module 220 is configured to add an empty query to the set of queries to act as a default, when, for example, a query provided by a user is not related (e.g., a close enough match) to any of the queries in the table index 262.

The prompt generation module 230 is configured to generate a prompt for the snippet generation model 242 for each query in the comprehensive set of queries using the information related to and/or provided by the video resource. For example, the prompt may include the selected query, the page title, a description for the video resource, and the transcript. In some cases, the prompt may also include the video content and/or OCR text generated from the video content.

The snippet generation module 240 is configured to generate a snippet for each of the queries in the comprehensive set of queries generated by the merge module 220 based on the prompts provided by the prompt generation module 230 by employing the snippet generation model 242. The snippet generation model 242 is a generative model, such as a language model, that is trained to generate a snippet (i.e., a short description or summary) for a video resource in the context of a specific query based on a prompt. As described above, the prompt may include a query and information related to or provided by a video resource (e.g., page title, description, transcript, video content, OCR text, metadata, and the like). In some implementations, the snippet generation model 242 is trained to generate a snippet having less than a threshold number of character (e.g., less than 50, 60, 70, 80, 90, 100, 110, 120, 130, 140, 150, 160, 170, 180, 190, 200, 225, 250, 275, 300, and so forth number of characters). In some implementations, the snippet generation model 242 is trained to generate a snippet that is formulated using the query to ensure a relationship or relevance to the query. In some implementations, the snippet generation model 242 is trained to generate a snippet using the page title to add value beyond simply repeating the page title. In some implementations, the snippet generation model 242 is trained to generate a snippet using the description and speech transcripts (captions) to identify content that is most relevant to the query (i.e., generates a query relevant output snippet), which is then used to generate the snippet.

The groundedness generation module 250 is configured to determine an indication (e.g., a groundedness score) of how well each snippet generated by the snippet generation model 242 aligns with the prompt that was provided to the snippet generation model 242. As depicted in FIG. 2A, in some implementations, the groundedness generation module 250 employs the groundedness model 252 to determine a groundedness score (e.g., between 0 and 1) for each snippet. In some implementations, the groundedness model 252 is an Attributable to Identified Sources (AIS) model trained to ascertain whether the generated snippets are grounded with respect to the content of the video resource. In general, AIS is an evaluation framework for assessing whether the output of models (e.g., the generated snippet) only contains information that is verifiable in source documents (e.g., related to or provided by the video resource) or attributable to identified sources. In some implementations, the AIS model receives the premise and determines whether the included hypothesis (e.g., the snippet aligns with the prompt) is true (entailment), false (contradiction), or undetermined (neutral) given the premise.

In some implementations, the groundedness generation module 250 removes any snippets with a groundedness score that does not meet a groundedness threshold value. In some implementations, the groundedness generation module 250 is configured to update the prompt (e.g., with additional context provided by the groundedness model 252) associated with the query and snippet having a groundedness score that does not meet the groundedness threshold value. In such implementations, the update prompt is provided to the snippet generation module 240 and the respective snippet regenerated.

In some implementations, table generation module 260 is configured to index each of the verified grounded snippets and respective query according to a unique identifier for each video resource. In some implementations, table generation module 260 is configured to store the index of snippets, queries, and groundedness scores to the table index 262. In some implementations, table generation module 260 is configured to generate a default snippet for the video resource and index the default snippet with an empty query or a set default or catchall query for the resource. In some implementations, the table index 262 stores key, value records for the snippets for the determined relevant queries of a video resource. In some implementations, the key of a record is a unique identifier for the video resource and the value includes a list of the query, the snippet, and the generated groundedness score. In some implementations and as described above, the table index 262 and the search index 150 are part of the same datastore. In some implementations, the table index 262 and the search index 150 are separate datastores.

In some implementations, the generative models 212, 242, and 252 generate data when queries and respective snippets are generated for a video resource. In some implementations, the data is stored to datastore (e.g., a log file) in log records. In some cases, the log records capture, for example, the prompts generated for each query, set of queries generated for each video resource, the snippets generated for each video resource and set of queries, and the groundedness scores generated for each snippet. Certain data from the log records may be treated in one or more ways before it is stored in the model log so that personally identifiable information is removed. The log records may be used by an evaluation system (not shown) to identify areas in which the generative models 212, 242, and 252 need intervention, including additional training or avoidance of unsuitable responses. The log records may also be used by a refinement module (not shown) to generate training data used to further refine (fine-tune, train) the generative models 212, 242, and 252. The training data can include labeled training examples to assist with various training techniques, such as few-shot training.

Figure 2B:
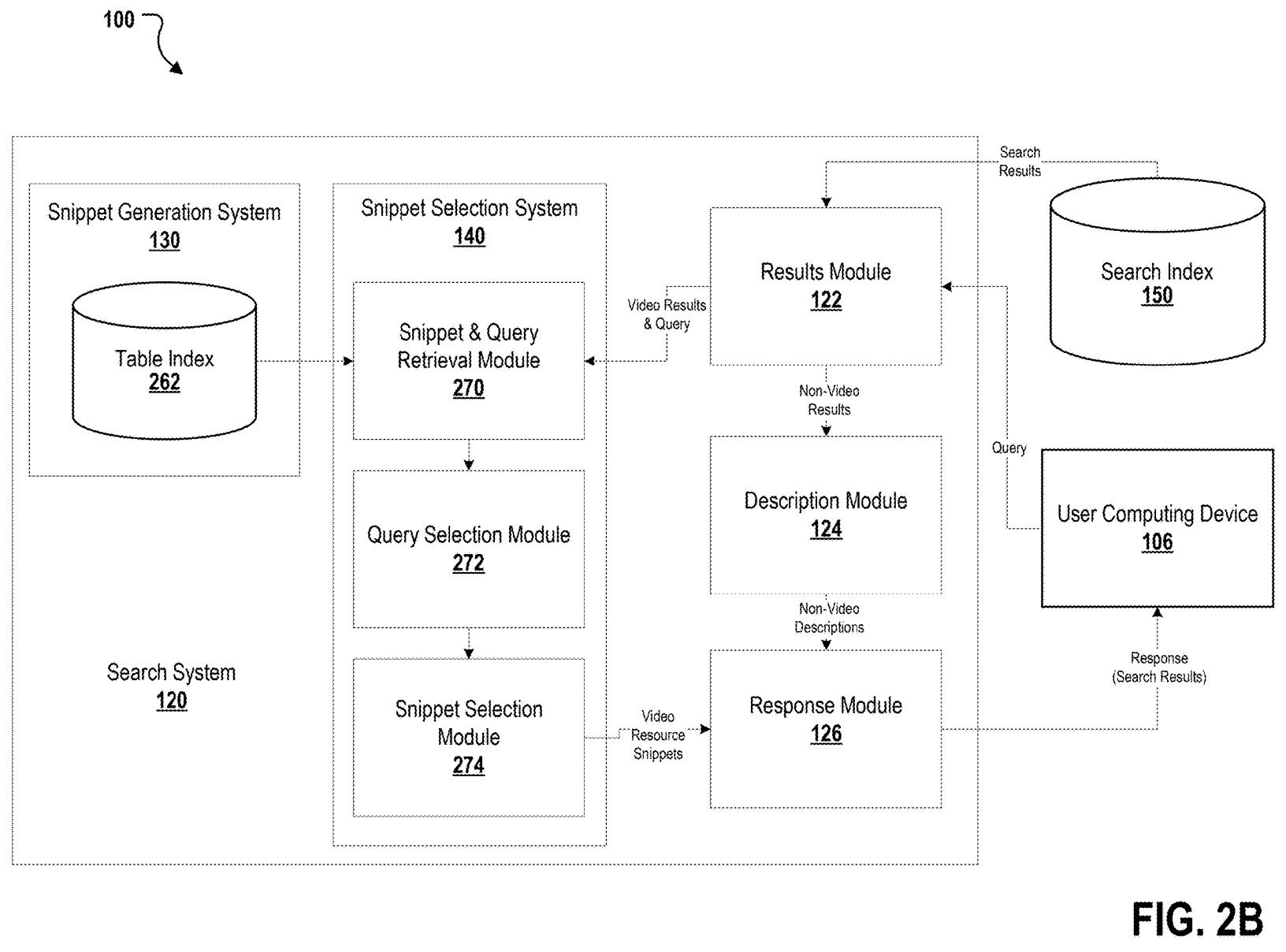

FIG. 2B is a diagram that illustrates an example of the snippet selection system 140, according to disclosed implementations. As described above, the snippet selection system 140 may be configured to select a query specific snippet each video resource responsive to a query provided via a user computing device 106. As depicted in FIG. 2B, the snippet selection system 140 includes snippet & query retrieval module 270, query selection module 272, and snippet selection module 274. In some implementations, the modules 270, 272, and 274 are executed via an electronic processor (e.g., processing units) configured to process instructions (e.g., modules, engines, models) stored in a memory, such as described below with reference to FIG. 5.

As described above, in some implementations, in response to receiving a search query from a user computing device 106, the search system 120 processes the query via the results module 122, which is configured to access the search index 150 to identify resources 104 that are relevant to the search query. In some implementations, the results module 122 is configured to provide the video resources from the identify the resources 104 for the query to the snippet & query retrieval module 270.

In some implementations, the snippet & query retrieval module 270 is configured to retrieve the records (e.g., the queries and snippets) for each video resource from the table index 262. In some implementations, the snippet & query retrieval module 270 retrieves the records based on a unique identifier for the video resource. In some implementations, the unique identifier is provided via the search index 150 when the resource is identified as responsive to a query.

In some implementations, for each video resource, the query selection module 272 is configured to score the relevance of each of the queries included in the records pulled from the table index 262 to the query provided by the user and the snippet selection module 274 is configured select the record having the query with the highest relevance score. The snippet selection module 274 then generates a set of snippets to include with each video resource in the search result. In some implementations, the snippet selection module 274 is configured to generate a default snippet when the no score for the queries meets a similarity threshold or when the table index 262 does not include any records for the unique identifier for the video resource. As described above, in some implementations, the response module 126 is configured to combine the snippets for the video resources 104 and the non-video resource 104 into search results, which is provided by the search system 120 as a response to the query to the user computing device 106.

Example Processes

FIG. 3 depicts a flowchart of example process 300 that can be implemented by implementations of the present disclosure. The example process 300 can be implemented by systems and components described with reference to FIGS. 1, 2A, 2B, and 5. The example process 300 shows in more detail generating a description (i.e., a snippet) for a video response.

For clarity of presentation, the description that follows generally describes the example process 300 in the context of FIGS. 1, 2A, 2B, and 5. However, it will be understood that the process 300 may be performed, for example, by any other suitable system, environment, software, and hardware, or a combination of systems, environments, software, and hardware as appropriate. In some implementations, various operations of the process 300 can be run in parallel, in combination, in loops, or in any order.

At 302, a resource providing video content is received. For example, in some cases, the resource may be processed as during an indexing phase conducted by the search system 120 to build the search index 150 (i.e., crawled and indexed by a search engine). In other cases, the snippet generation system may process the search index after the search system 120 builds the search index 150.

From 302, the process 300 proceeds to 304 where a query having the resource as a relevant result is determined by, for example, the query generation module 210. In some cases, the query is generated by the query generation module 210 as one of a set of queries generated for the resource. In some implementations, the query generation module 210 generates the set of queries via the query generation model 212. In some cases, the resource includes text data and metadata related to the video content. In some cases, the query generation model 212 is trained to generate the set of queries based on a transcript of the video content, the text data, or the metadata. In some cases, the query is determined by the query generation module 210 from a set of historic navigational queries for the resource. For example, the query generation module 210 may use historical search records to determine which queries have resulted in positive engagements with the resource. The query generation module 210 may use at least some of these identified queries for the resource.

From 304, the process 300 proceeds to 306 where a description (e.g., a snippet) of the resource is generated by processing a prompt through a generative model (e.g., the snippet generation module 240 provides the prompt as input to the snippet generation model 242). In some cases, the prompt includes the query and descriptive content related to the video content. In some cases, a transcript of the video content is generated by processing the video content through a speech recognition algorithm. In some cases, text-based content presented in the video content is generated by processing the video content through an optical character recognition algorithm. In some cases, the descriptive content includes, for example, the query, a page title from the resource, text describing the video content, the transcript of the video content, or the text-based content. In some implementations, the generative model (e.g., the snippet generation model 242) is trained to identify a portion of the descriptive content that is relevant to the query and generate the description based on the portion.

From 306, the process 300 proceeds to 308 where the query and the description are stored (e.g., to table index 262) based on a groundedness score meeting a groundedness threshold. For example, as described above, the groundedness generation module 250 removes any descriptions (e.g., snippets) with a groundedness score that does not meet a groundedness threshold value and stores the descriptions when they meet the groundedness threshold. As described above, in some cases, the groundedness score indicates an alignment between the description and the prompt. In some implementations, the groundedness score is generated by the groundedness generation module 250 by processing (e.g., providing as input) the prompt and the description through the groundedness model 252. In some cases, the query and the description are indexed when stored (e.g., to table index 262) based on a unique identifier for the resource by the table generation module 260.

From 308, the process 300 proceeds to 310 where the description is provided in a search result that includes the resource. For example, the search result may be provided as a response to a search query provided via user computing device 106. In some implementations, the description is selected for inclusion in the search result (and associated with the resource in the search result) based on a relevance score (e.g., determined by the query selection module 272) between the determined query and the search query provided via user computing device 106. For example, the query selection module 272 may selected a set of queries, stored to the table index 262, that are related to the resource, determine a relevance score (e.g., a score representing a similarity between queries in the context of a particular resource) for between the search query and each query in the set of queries, and provide the description (e.g., snippet) that is associated with the query having the highest relevance score to the search query. In some cases, when no query in the set of queries has a relevance score for the search query that meets a similarity threshold, the query selection module 272 selects (e.g., from the table index 262) or generates a default description to includes in the search result for the resource. From 310, the process 300 ends or repeats.

FIG. 4 depicts a flowchart of example process 400 that can be implemented by implementations of the present disclosure. The example process 400 can be implemented by systems and components described with reference to FIGS. 1, 2A, 2B, and 5. The example process 400 shows in more detail generating a response to a search query that includes a description generated for a video resource.

For clarity of presentation, the description that follows generally describes the example process 400 in the context of FIGS. 1, 2A, 2B, and 5. However, it will be understood that the process 400 may be performed, for example, by any other suitable system, environment, software, and hardware, or a combination of systems, environments, software, and hardware as appropriate. In some implementations, various operations of the process 400 can be run in parallel, in combination, in loops, or in any order.

At 402 a search query is received. For example, the search query may be provided to the search system 120 via user computing device 106.

From 402, the process 400 proceeds to 404 where a resource providing video content that is responsive to the search query is determined (e.g., via search system 120).

From 404, the process 400 proceeds to 406 where a description (e.g., a snippet) for the video content is selected based on a relevance score between the search query and a query generated by the query generation module 210 and associated with the description by the snippet generation module 240. In some cases, the query is generated by the query generation module 210 as one of a set of queries generated for the resource. In some implementations, the query generation module 210 generates the set of queries via the query generation model 212. In some cases, the resource includes text data and metadata related to the video content. In some cases, the query generation model 212 is trained to generate the set of queries based on a transcript of the video content, the text data, or the metadata. In some cases, the query is generated by the query generation module 210 from a set of historic navigational queries for the resource.

In some implementations, the description is generated by processing a prompt through a generative model (e.g., the snippet generation module 240 provides the prompt as input to the snippet generation model 242). In some cases, the prompt includes the determined query and descriptive content related to the video content. In some cases, a transcript of the video content is generated by processing the video content through a speech recognition algorithm. In some cases, text-based content presented in the video content is generated by processing the video content through an optical character recognition algorithm. In some cases, the descriptive content includes, for example, the query, a page title from the resource, text describing the video content, the transcript of the video content, or the text-based content. In some implementations, the generative model (e.g., the snippet generation model 242) is trained to identify a portion of the descriptive content that is relevant to the query and generate the description based on the portion.

In some implementations, the description is selected for inclusion in the search result (and associated with the resource in the search result) based on a relevance score (e.g., determined by the query selection module 272) between the query and the search query provided via user computing device 106. For example, the query selection module 272 may selected a set of queries, stored to the table index 262, that are related to the resource, determine a relevance score (e.g., a score representing a similarity between queries in the context of a particular resource) for between the search query and each query in the set of queries, and provide the description (e.g., snippet) that is associated with the query having the highest relevance score to the search query. In some cases, when no query in the set of queries has a relevance score for the search query that meets a similarity threshold, the query selection module 272 selects (e.g., from the table index 262) or generates a default description to includes in the search result for the resource.

From 406, the process 400 proceeds to 408 where a response to the search query that includes the video content and the description is provided. For example, the search result may be provided as a response to the user computing device 106. From 408, the process 400 ends or repeats.

Example System

FIG. 5 shows an example of a computing device 500, which may be search system 120 of FIGS. 1, 2A and 2B, which may be used with the techniques described here. The example computing device 500 can be programmed or otherwise configured to implement systems or methods of the present disclosure. Computing device 500 is intended to represent various example forms of large-scale data processing devices, such as servers, blade servers, data centers, mainframes, and other large-scale computing devices. Computing device 500 may be a distributed system having multiple processors, possibly including network attached storage nodes, that are interconnected by one or more communication networks. The components shown here, their connections and relationships, and their functions, are meant to be examples only, and are not meant to limit implementations of the implementations described and/or claimed in this document.

Computing device 500 may be a distributed system that includes any number of computing devices 580 (e.g., 580a, 580b, 580c, and 580d). Computing devices 580 may include a server or rack servers, mainframes, and the like. communicating over a local or wide-area network, dedicated optical links, modems, bridges, routers, switches, wired or wireless networks, and the like.

In some implementations, each computing device may include multiple racks. For example, computing device 580a includes multiple racks (e.g., 558a, 558b, . . . , 558n). Each rack may include one or more processors, such as processors 552a, 552b, . . . , 552n and 562a, 562b, . . . , 562n. The processors may include data processors, network attached storage devices, and other computer-controlled devices. In some implementations, one processor may operate as a master processor and control the scheduling and data distribution tasks. Processors may be interconnected through one or more rack switches 562a-562n, and one or more racks may be connected through switch 578. Switch 578 may handle communications between multiple connected computing devices 500.

Each rack may include memory, such as memory 554 and memory 564, and storage, such as 556 and 566. Storage 556 and 566 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 556 or 566 may be shared between multiple processors, multiple racks, or multiple computing devices and may include a non-transitory computer-readable medium storing instructions executable by one or more of the processors. Memory 554 and 564 may include, e.g., volatile memory unit or units, a non-volatile memory unit or units, and/or other forms of non-transitory computer-readable media, such as a magnetic or optical disks, flash memory, cache, Random Access Memory (RAM), Read Only Memory (ROM), and combinations thereof. Memory, such as memory 554 may also be shared between processors 552a-552n. Data structures, such as an index, may be stored, for example, across storage 556 and memory 554. Computing device 500 may include other components not shown, such as controllers, buses, input/output devices, communications modules, and the like.

An entire system may be made up of multiple computing devices 500 communicating with each other. For example, device 580a may communicate with devices 580b, 580c, and 580d, and these may collectively be known as search system 120. Some of the computing devices may be located geographically close to each other, and others may be located geographically distant. The layout of computing device 500 is an example only and the system may take on other layouts or configurations.

It should also be understood that although certain drawings illustrate hardware and software located within particular devices, these depictions are for illustrative purposes only. In some implementations, the illustrated components may be combined or divided into separate software, firmware, or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Moreover, various implementations of the systems and techniques described herein can be realized in digital electronic circuitry, integrated circuitry, specially designed ASICs (application specific integrated circuits), computer hardware, firmware, software, or combinations thereof. These various implementations can include implementation in one or more computer programs that are executable or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include computer readable or machine instructions for a programmable electronic processor and can be implemented in a high-level procedural or object-oriented programming language, or in assembly/machine language. As used herein, the terms "machine-readable medium" and "computer-readable medium" refers to any computer program product, apparatus or device (e.g., magnetic discs, optical disks, memory, Programmable Logic Devices (PLDs)) used to provide machine instructions or data to a programmable processor, including a machine-readable medium that receives machine instructions as a machine-readable signal. The term "machine-readable signal" refers to any signal used to provide machine instructions or data to a programmable processor.

The functionality of the computer readable instructions may be combined or distributed as desired in various environments. In some implementations, a computer program includes one sequence of instructions. In some implementations, a computer program includes a plurality of sequences of instructions. In some implementations, a computer program is provided from one location. In other implementations, a computer program is provided from a plurality of locations. In various implementations, a computer program includes one or more software modules. In various implementations, a computer program includes, in part or in whole, one or more web applications, one or more mobile applications, one or more standalone applications, one or more web browser plug-ins, extensions, add-ins, or add-ons, or combinations thereof.

Unless otherwise defined, the technical terms used herein have the same meaning as commonly understood by one of ordinary skill in the art to which the present subject matter belongs. As used in this specification and the appended claims, the singular forms "a," "an," and "the" include plural references unless the context clearly dictates otherwise. Any reference to "or" herein is intended to encompass "and/of" unless otherwise stated.

A number of implementations have been described. Nevertheless, it will be understood that various modifications may be made without departing from the spirit and scope of the disclosed implementations. While preferred implementations of the present disclosure have been shown and described herein, it will be obvious to those skilled in the art that such implementations are provided by way of example only. Numerous variations, changes, and substitutions will now occur to those skilled in the art without departing from the described system. It should be understood that various alternatives to the implementations described herein may be employed in practicing the described system.

Moreover, the separation or integration of various system modules and components in the implementations described earlier should not be understood as requiring such separation or integration in all implementations, and it should be understood that the described components and systems can generally be integrated together in a single product or packaged into multiple products. Accordingly, the earlier description of example implementations does not define or constrain this disclosure. Other changes, substitutions, and alterations are also possible without departing from the spirit and scope of this disclosure.

What is claimed is:

1. A method comprising:
receiving a resource providing video content;
determining a query having the resource as a relevant result;
generating a description of the resource by processing a prompt through a generative model, the prompt including the determined query and descriptive content related to the video content;

storing the determined query and the description based on a groundedness score meeting a groundedness threshold; and
providing the description in a search result that includes the resource.

2. The method of claim 1, wherein the generative model is a first generative model, the method further comprising generating the determined query by processing the resource through a second generative model.

3. The method of claim 2, wherein the resource includes text data and metadata related to the video content.

4. The method of claim 3, wherein the determined query is generated based on a transcript of the video content, the text data, or the metadata.

5. The method of claim 1, wherein the determined query is a historic navigational query for the resource.

6. The method of claim 1, wherein the descriptive content includes the determined query, a page title from the resource, text describing the video content, a transcript of the video content, or text presented in the video content.

7. The method of claim 1, wherein the generative model is trained to identify a portion of the descriptive content that is relevant to the determined query and generate the description based on the portion.

8. The method of claim 1, wherein the generative model is a first generative model, the method further comprising:
generating the groundedness score by processing the prompt and the description through a third generative model, wherein the third generative model is an Attributable to Identified Sources model.

9. The method of claim 1, further comprising:
generating a transcript of the video content by processing the video content through a speech recognition algorithm, wherein the descriptive content includes the transcript.

10. The method of claim 1, further comprising:
generating text-based content presented in the video content by processing the video content through an optical character recognition algorithm, wherein the descriptive content includes the text-based content.

11. The method of claim 1, wherein the resource was crawled and indexed by a search engine.

12. The method of claim 1, wherein the determined query and the description are indexed when stored based on a unique identifier for the resource.

13. The method of claim 1, wherein the search result is provided in response to a user query.

14. The method of claim 13, further comprising:
determining a relevance score representing a similarity between the determined query and the user query in a context of the resource; and
including the description in the search result based on the relevance score.

15. The method of claim 14, wherein the description is a default description based on the relevance score and a similarity threshold.

16. A method comprising:
receiving a search query;
determining a resource providing video content that is responsive to the search query;
selecting a description for the video content based on a relevance score between the search query and a generated query associated with the description, the description having been generated for the generated query and descriptive content related to the video content; and providing a response to the search query that includes the video content and the description.

17. The method of claim 16, further comprising generating the generated query by processing the resource through a generative model.

18. The method of claim 16, wherein the descriptive content includes the generated query, a page title from the resource, text describing the video content, a transcript of the video content, or text presented in the video content.

19. A system comprising:

an electronic processor; and a memory communicably coupled to the electronic processor and storing instructions that, when executed by the electronic processor, cause the system to:

receive a resource providing video content;

determine a query having the resource as a relevant result;

generate a description of the resource by processing a prompt through a generative model, the prompt including the determined query and descriptive content related to the video content;

store the determined query and the description based on a groundedness score meeting a groundedness threshold; and provide the description in a search result that includes the resource.

20. The system of claim 19, wherein the generative model is a first generative model, the groundedness score indicates an alignment between the description and the prompt, and the electronic processor is further configured to determine the query by processing the resource through a second generative model.

\*    \*    \*    \*    \*